(12) United States Patent
Stovall et al.

(10) Patent No.: US 6,215,998 B1
(45) Date of Patent: *Apr. 10, 2001

(54) LOCAL COMPONENT-SPECIFIC CONSOLE

(75) Inventors: Gregory T. Stovall; David Wesley McKnight, both of Garland, TX (US)

(73) Assignee: Nortel Networks Limited, Montreal (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/988,685

(22) Filed: Dec. 11, 1997

(51) Int. Cl.$^7$ ................................................. H04B 17/00
(52) U.S. Cl. ........................ 455/423; 455/67.1; 455/456
(58) Field of Search .................................... 455/423, 424, 455/425, 67.1–67.7, 456, 457; 379/9, 21, 26

(56) References Cited

U.S. PATENT DOCUMENTS

| | | |
|---|---|---|
| 3,739,329 | 6/1973 | Lester . |
| 4,068,105 * | 1/1978 | Jain et al. ............................... 714/43 |
| 4,512,442 * | 4/1985 | Moore et al. ......................... 187/393 |
| 4,697,243 * | 9/1987 | Moore et al. ......................... 187/393 |
| 4,771,865 * | 9/1988 | Hinderling ............................ 187/391 |
| 4,972,453 * | 11/1990 | Daniel, III et al. ..................... 379/10 |
| 5,157,667 * | 10/1992 | Carusone, Jr. et al. ................ 714/45 |
| 5,334,974 | 8/1994 | Simms et al. . |
| 5,394,459 | 2/1995 | Djuphammar et al. . |
| 5,448,221 | 9/1995 | Weller . |
| 5,448,675 | 9/1995 | Leone et al. . |
| 5,515,426 | 5/1996 | Yacenda et al. . |
| 5,555,297 * | 9/1996 | Ochy P. et al. ........................ 379/16 |
| 5,583,517 | 12/1996 | Yokev et al. . |
| 5,604,765 | 2/1997 | Bruno et al. . |
| 5,608,412 | 3/1997 | Welles, II et al. . |
| 5,703,929 * | 12/1997 | Schillaci et al. ..................... 455/423 |
| 5,736,973 * | 4/1998 | Godfrey et al. ..................... 345/102 |
| 5,742,666 | 4/1998 | Alpert . |
| 5,764,726 * | 6/1998 | Selig et al. .......................... 455/423 |
| 5,812,934 | 9/1998 | Hard et al. . |
| 5,850,426 * | 12/1998 | Watkins et al. ........................ 379/29 |
| 5,952,958 | 9/1999 | Speasl et al. . |
| 5,986,568 * | 11/1999 | Suzuki et al. ................... 340/820.52 |
| 5,990,826 | 11/1999 | Mitchell . |
| 6,026,306 | 2/2000 | Foladare et al. . |
| 6,047,193 * | 4/2000 | Stovall et al. ........................ 455/456 |

FOREIGN PATENT DOCUMENTS

| | | |
|---|---|---|
| 0712228 | 5/1996 | (EP) . |
| 2582177 | 11/1986 | (FR) . |
| 2142506 | 1/1985 | (GB) . |
| 2245801 | 8/1992 | (GB) . |
| 2288709 | 10/1995 | (GB) . |
| WO 94/23546 | 10/1994 | (WO) . |

OTHER PUBLICATIONS

U.S. application No. 08/968,272, Gregory T. Stovall et al., filed Nov. 12, 1997, System and Method for Locating a Switch Component, 7 pages of specification, 23 claims, abstract and 2 sheets of drawings.

* cited by examiner

Primary Examiner—Nguyen T. Vo
Assistant Examiner—Duc Nguyen
(74) Attorney, Agent, or Firm—Haynes and Boone, LLP

(57) ABSTRACT

A system and method for remotely monitoring and controlling signals to or from a component in a central office switching system having many components, such as line cards. The component reports status signals to a processing facility, which receives the status signals and broadcasts them to a device located in the central office. The device, upon receiving the broadcasted signals, displays the status signals so that a user can thereby monitor the component.

25 Claims, 2 Drawing Sheets

US 6,215,998 B1

LOCAL COMPONENT-SPECIFIC CONSOLE

TECHNICAL FIELD

This invention relates generally to switching systems, and in particular, to a system and method for remotely monitoring and/or controlling signals to and from a component in the switching system.

BACKGROUND OF THE INVENTION

A conventional public switched telephone network ("PSTN") is formed by routing trunks or lines between various switching systems. The switching systems are often physically grouped together to form a central office. A central office may connect any combination of lines and trunks, and therefore can be used in local switching systems (for interconnecting lines and trunks) and network switching systems (for interconnecting trunks). For purposes of simplicity, only a local switching system for interconnecting lines and trunks will be further discussed.

Often, a single central office switches literally hundreds or thousands of lines. The central office therefore must arrange the switching hardware in a logical manner so that it may be readily accessed, serviced, or replaced. A typical central office will be housed in a multi-floor building, each floor including several rows of switch frames, each switch frame including several shelves of line cards, and each line card serving multiple lines.

A typical central office also contains a central processing facility, or management console. The management console controls the operation of the equipment in the central office, including the frames and line cards stored therein. For example, the management console may show certain status indicators for an individual line card that inform a technician as to how the card is working or if it is working properly. In this example, an error has occurred in a particular line card. The technician first goes to the management console to view the status indicators and determine the faulty line card. The technician then finds the line card, performs corrective maintenance thereon, and returns to the management console to verify that the line card is working as desired.

To avoid requiring the technician to run back and forth between the line card and the management console, two technicians typically work together, one at the line card and one at the management console, and communicate via radio or other conventional means. This solution is undesirable due to the high labor cost of the two technicians. Also, this solution is inherently prone to errors due to communication failures. Instead, what is needed is a system and method that allows a technician to monitor the status indicators that normally appear on the maintenance console, while working on the line card or other switch component.

SUMMARY OF THE INVENTION

The foregoing problems are solved and a technical advance is achieved by a system and method for remotely monitoring and controlling signals to or from a component in a switching system such as a central office. In one embodiment, the central office has many components, such as line cards, and a processing facility. One of the components reports status signals to the processing facility, which receives the status signals and broadcasts them to a device located in the central office. The device, upon receiving the broadcasted status signals, displays the status signals so that a user can thereby monitor the component.

In another embodiment, the processing facility also broadcasts a location signal to the device, the location signals being used to find the component. The device, upon receiving the broadcasted location signals, displays them as well, so that the user can easily find or identify the component.

In yet another embodiment, the device can also send a code to the processing facility. The code is used to control the component, through the processing facility.

DESCRIPTION OF THE PREFERRED EMBODIMENT

Figure 1:
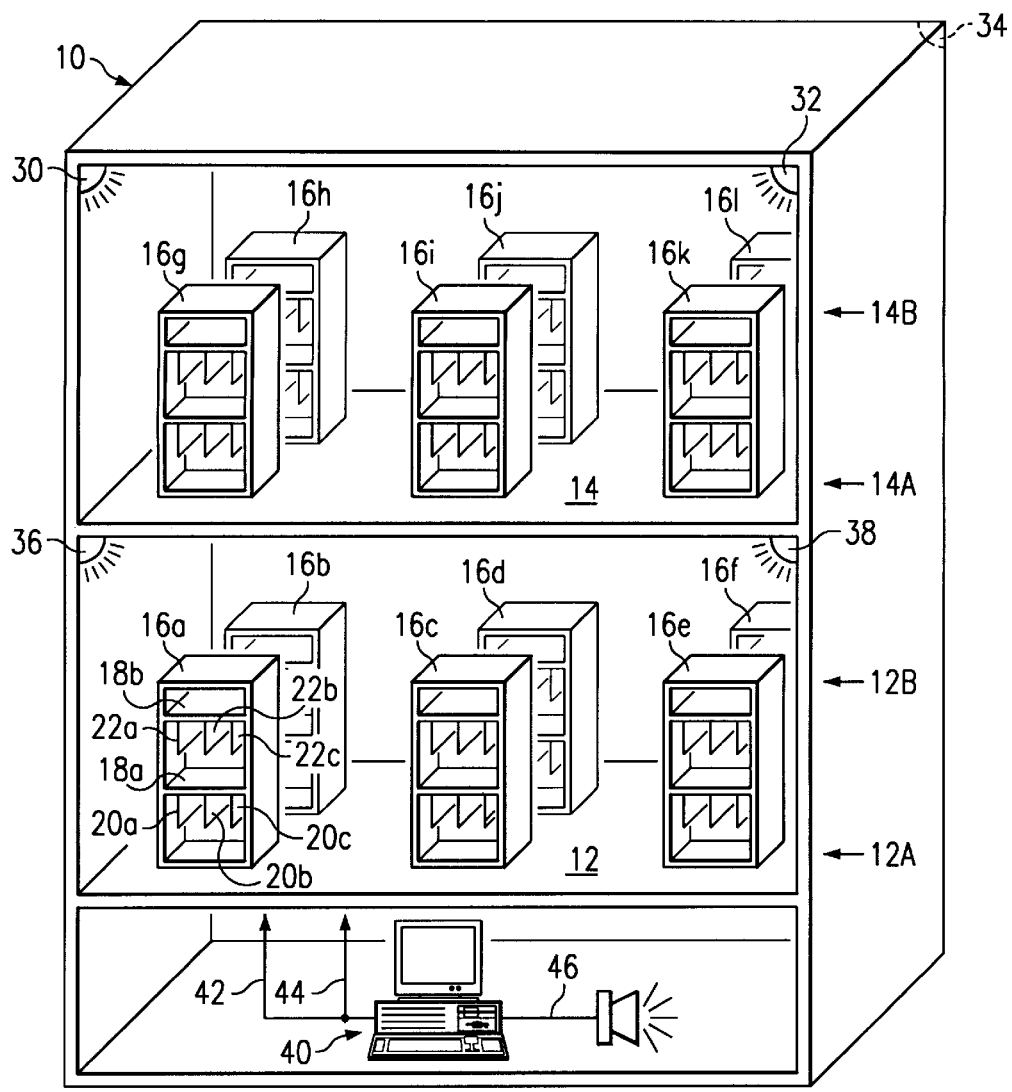
FIG. 1 illustrates an exemplary, simplified central office.

Referring to FIG. 1, the reference numeral 10 designates a central office for utilizing one embodiment of the present invention. The central office 10 includes two floors 12, 14, each of which includes two rows 12A, 12B, and 14A, 14B, respectively, of frames 16a–16l. Each of the frames 16a–16l are similarly configured, as shown by representative frame 16a, having two shelves 18a and 18b, each having three line cards 20a, 20b, 20c and 22a, 22b, 22c, respectively.

The central office 10 also includes several low power spread-spectrum transmitters 30, 32, 34, 36, 38. The transmitters are strategically placed throughout the central office 10 so that each line card of each frame 16a–16l can receive signals from at least three of the transmitters. The transmitters 30–38 are all tightly synchronized, with each transmitter emitting a unique signal. The signals are similar to the signals provided by global positioning satellites, thereby providing any receiver with at least three signals to triangulate its exact location. It is understood that the placement of the transmitters is subject to unique RF characteristics of the central office 10, which can be readily determined by one of ordinary skill in the art.

The central office 10 also includes a central processing facility 40 for receiving and processing, among other things, location information and status information from each of the line cards. In one embodiment, the central processing facility 40 is a computer that receives the location and status information through a data bus 42 connected to each of the line cards. It is understood, however, that the functionality of the central processing facility may be distributed through one or more devices. Also, the data bus 42 may represent a bus, such as an Ethernet bus, dedicated for the functions described herein, or available bandwidth on an existing bus. In another embodiment, the central processing facility 40 receives the location through a radio frequency (RF) receiver antenna 44. The central processing facility 40 also includes an RF transmitter 46 for transmitting various signals and information, as discussed in greater detail, below.

Because of the multiplicity of components in the central office 10, it is often very difficult to find a particular line card to access, service, or replace. This problem has been addressed in U.S. patent application Ser. No. 968,272 entitled "System and Method for Locating a Switch Component", filed Nov. 11, 1997 which is hereby incorporated by reference. Therefore, each component can determine its location and transmit it to the central processing facility 40. In addition, each component reports status information to the central processing facility 40.

Figure 2:
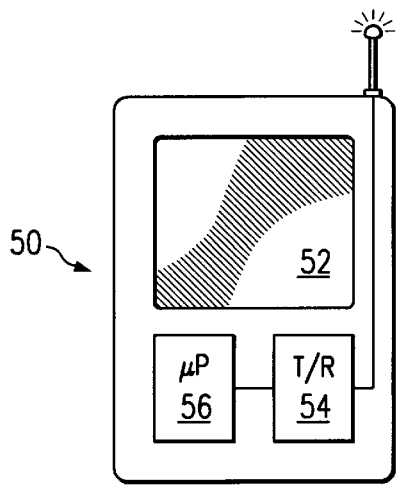
FIG. 2 illustrates a personal digital assistant used to display status and/or location information for a component of the central office of FIG. 1.

Referring to FIG. 2, the reference numeral 50 designates a personal computer, or digital assistant, hereinafter "PDA". The PDA 50 may be a commercially available PDA, such as a NEWTON computer by Apple Computer, Inc. of Cupertino, Calif. Alternatively, the PDA 50 may be a simple display, such as a liquid crystal display, with a limited amount of processing capabilities. The PDA 50 includes a monitor 52, an RF transmitter/receiver 54, and a controller 56. In an alternative embodiment, the RF transmitter/receiver 54 may be a data port (not shown) connectible to a data bus on the frame 16a. Also, the PDA 50 includes a hook (not shown) so that it can be attached to a frame. The PDA 50 can therefore be used by a technician or user in conjunction with the central processing facility 40 to work on a frame or line card, as described in greater detail below.

Figure 3:
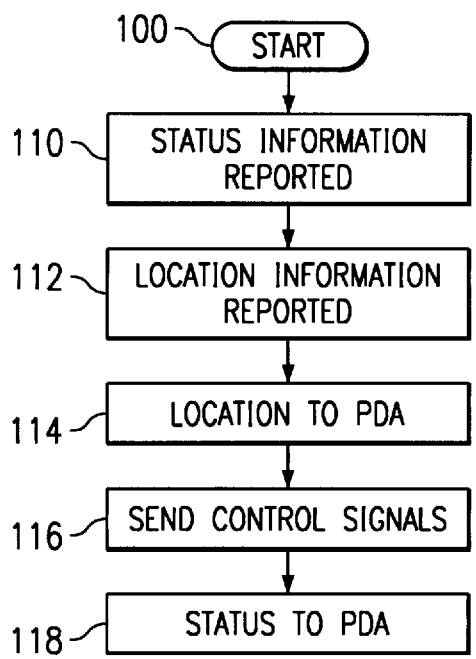
FIG. 3 is a flow chart of a routine performed to supply the status and/or location information to the personal digital assistant of FIG. 2.

Referring to FIG. 3, a method 100 is used to facilitate repair of a component in the central office 10. For the sake of example, the line card 22a of frame 16a will be found, diagnosed, and repaired. At step 110, the line card 22a reports status information to the central processing facility 40 that indicates that the line card 22a needs attention. Alternatively, the central processing facility 40 may deduce that the line card 22a needs attention, such as by noticing that the line card is no longer communicating or by a scheduled maintenance timer. At step 112, the line card 22a reports its location information to the central processing facility 40. Alternatively, such as when the line card 22a is no longer communicating, the central processing facility 40 previously stored location information for the line card.

At step 114, the central processing facility 40 reports the location information to the PDA 50. In the preferred embodiment, the central processing facility 40 converts the location information to a physical location that can be easily used by an individual. For example, line card 22a can be mapped to:

(floor 1, row 1, frame 1, shelf 1, card 1).

In this way, a user having the PDA 50 can locate the line card 22a. Although not shown, in alternative embodiments, the PDA 50 may include the necessary hardware and software to report to the central processing facility its location information so that the central processing facility may provide relative location information (e.g., "down two floors"). In yet another alternative embodiment, the PDA, in combination with the location information, can deduce its own physical and/or relative location information.

Upon finding the line card 22a, the user may request the status information to be supplied to the PDA 50 at step 116. This step may be accomplished in one of various ways. For one, either the PDA 50 or the central processing facility 40 may realize that the PDA and line card 22a are in close proximity. For another, the user may signal the PDA 50 or central processing facility 40 by pressing a key (not shown) on the PDA, on the frame 16a, or on the line card 22a. At step 118, the central processing facility 40 begins to transmit the status information to the PDA 50. The user may thereby perform maintenance on the line card 22a while observing the status information. Steps 116 and 118 may be repeated throughout the maintenance process. In another alternative embodiment, the PDA may be capable of transmitting codes to the component in order to monitor and control the component.

Figure 4:
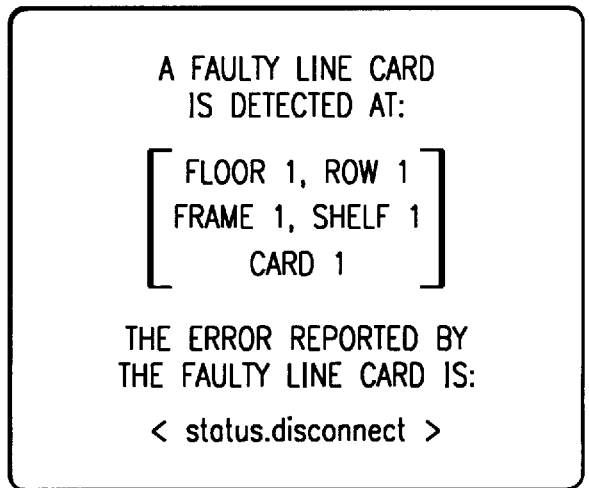
FIG. 4 is an exemplary display output of the personal digital assistant of FIG. 2.

Referring to FIG. 4, in an alternative embodiment, both the status information and the location information are simultaneously provided to the PDA 50, as illustrated on the monitor 52. For example, the user may attach the data port of the PDA 50 to a bus (not shown) at the frame 16a. The central processing facility, through the bus, then notifies the PDA 50 which line card 22a is in need of repair and also reports the corresponding status information. In yet another alternative embodiment, only the status information is provided.

Although illustrative embodiments of the invention have been shown and described, other modifications, changes, and substitutions are intended in the foregoing disclosure. For example, the above described embodiment can be easily implemented in different components besides line cards. Accordingly, it is appropriate that the appended claims be construed broadly and in a manner consistent with the scope of the invention.

What is claimed is:

1. A method for monitoring an output of a component in a switching system, the method comprising the steps of:

reporting the output and an identifier of the component to a central processing facility;

receiving the output and identifier at the central processing facility;

broadcasting the output and identifier to a personal digital assistant from the central processing facility;

receiving the output and identifier at the personal digital assistant;

displaying the output on the personal digital assistant and identifying the component from a group of components with the identifier; and determining the location of the personal digital assistant relative to the location of the component, whereby the personal digital assistant can receive the output and identifier of the component regardless of the personal digital assistant's proximity to the component.

2. The method of claim 1 further comprising:

broadcasting a location of the component to the personal digital assistant; and receiving the location at the personal digital assistant.

3. The method of claim 2 further comprising displaying the location of the component on the personal digital assistant.

4. The method of claim 2 further comprising:

reporting the location of the component to the central processing facility; and receiving the location of the component at the central processing facility.

5. The method of claim 1 wherein the output designates a status of the component.

6. The method of claim 1 wherein the output is reported using wireless communications.

7. The method of claim 1 wherein the output is reported using an existing data network.

8. The method of claim 1 wherein the output is reported using a dedicated data network.

9. The method of claim 1 wherein the output is broadcasted using wireless communications.

10. The method of claim 1 wherein the output is broadcasted using an existing data network.

11. The method of claim 1 wherein the output is broadcasted using a dedicated data network.

12. A system for monitoring an output of a component in a switching system having a central processing facility, the system comprising:

means for reporting the output to the central processing facility;

means for receiving the output at the central processing facility;

means for broadcasting, in realtime, the output and the location of the component to a personal digital assistant whether the personal digital assistant is located near to or far from the component;

means for receiving, in realtime, the output and the location of the component at the personal digital assistant;

means for displaying the output on the personal digital assistant; and means for determining the location of the personal digital assistant relative to the location of the component.

13. The system of claim 12 wherein the output designates a status of the component.

14. The system of claim 12 wherein the means for reporting uses wireless communications.

15. The system of claim 12 wherein the means for reporting uses an existing data network.

16. The system of claim 12 wherein the means for reporting uses a dedicated data network.

17. The system of claim 12 wherein the means for broadcasting uses wireless communications.

18. The system of claim 12 wherein the means for broadcasting uses an existing data network.

19. The system of claim 12 wherein the means for broadcasting uses a dedicated data network.

20. The system of claim 12 further comprising means for displaying the location of the component on the personal digital assistant.

21. The system of claim 12 further comprising:

means for reporting the location of the component to the central processing facility; and means for receiving the location of the component at the central processing facility.

22. A system for monitoring a plurality of components in a central office, the plurality of components reporting status information to a processing facility of the central office, the system comprising:

a broadcasting system for providing the status of a first and second component to a personal digital assistant located near the first component, and where the personal digital assistant is separate from the processing facility and separate from the second component;

a receiver connectable to the personal digital assistant for receiving the status;

a transmitter connectable to the personal digital assistant for transmitting a code to control the first component;

a locator connectable to the personal digital assistant for determining the location of the personal digital assistant relative to the location of the first component and the location of the second component.

23. The system of claim 22 wherein the broadcasting system uses wireless communications.

24. The system of claim 22 wherein the code is transmitted to the processing facility and wherein the processing facility controls the first component in response to the code.

25. The system of claim 22 wherein the broadcasting system also provides a location of the first component to the personal digital assistant.

* * * * *